US012318901B2

(12) United States Patent
Law

(10) Patent No.: US 12,318,901 B2
(45) Date of Patent: Jun. 3, 2025

(54) NAIL PULLING OR REMOVING DEVICE FOR USE WITH A PALM NAILER

(71) Applicant: Melvin Douglas Law, Glenbrook, NV (US)

(72) Inventor: Melvin Douglas Law, Glenbrook, NV (US)

( * ) Notice: Subject to any disclaimer, the term of this patent is extended or adjusted under 35 U.S.C. 154(b) by 271 days.

(21) Appl. No.: 18/062,799

(22) Filed: Dec. 7, 2022

(65) Prior Publication Data

US 2023/0173651 A1 Jun. 8, 2023

Related U.S. Application Data

(60) Provisional application No. 63/286,956, filed on Dec. 7, 2021.

(51) Int. Cl.
*B66F 15/00* (2006.01)
*B25C 11/02* (2006.01)

(52) U.S. Cl.
CPC .................................... *B25C 11/02* (2013.01)

(58) Field of Classification Search
CPC ........... B25C 11/00; B25C 11/02; B25C 9/00; B25C 7/00; B25C 3/00; B66F 15/00
See application file for complete search history.

(56) References Cited

U.S. PATENT DOCUMENTS

| | | | | |
|---|---|---|---|---|
| 7,712,199 | B1 * | 5/2010 | Wilson | E04F 21/22 29/270 |
| 10,934,726 | B2 * | 3/2021 | Elduayen Madariaga | E04G 17/0642 |
| 12,036,646 | B1 * | 7/2024 | Bormann | F16L 3/10 |
| 2012/0228568 | A1 * | 9/2012 | Leon | B25F 1/006 254/21 |
| 2013/0112045 | A1 * | 5/2013 | Piveronas | B25D 1/14 81/26 |
| 2023/0173651 | A1 * | 6/2023 | Law | B25C 11/02 254/18 |

* cited by examiner

*Primary Examiner* — Lee D Wilson
(74) *Attorney, Agent, or Firm* — Dunlap Bennett & Ludwig, PLLC

(57) ABSTRACT

A nail-removing device operatively associable with a pneumatic nail driver, affording a method of improving the pneumatic nail driver. The nail-removing device has a shaft extending between a nail end and a driver end. The nail end provides an engagement portion for engaging the underside of a nail. The driver end provides a stabilizing interface configured to operatively associate with the pneumatic nail driver so as to prevent lateral movement of the pneumatic nail driver relative to the stabilizing interface. The engagement portion and the stabilizing interface may be spaced apart from the shaft in the same direction.

7 Claims, 3 Drawing Sheets

NAIL PULLING OR REMOVING DEVICE FOR USE WITH A PALM NAILER

CROSS-REFERENCE TO RELATED APPLICATION

This application claims the benefit of priority of U.S. provisional application No. 63/286,956, filed 7 Dec. 2021, the contents of which are herein incorporated by reference.

BACKGROUND OF THE INVENTION

The present invention relates to construction tools and, more particularly, a nail pulling or removing device for use with a palm nailer.

A cat's paw or cat's claw is a standard carpenter's tool, consisting of a round, hexagonal, or flat bar that curves at one end to form a pointed, cup-shaped tip with a V-shaped cleft for gripping nail heads. To use the tool the user holds the tool's shank with one hand and drives the claw around a nail head with a hammer. When the V is firmly seated around the nail's shank, the users pull the bar back to raise the head, then finishes pulling the nail with the hammer's claw. The cat's paw is well designed for demolition work, but because it tears up the wood around the nail head, it should not be used for finish work. Furthermore, cat's paws and other handheld, man-powered denailing devices require a lot of torque. They also end up bending the nail because of the substantial torque that is required, making the nails unusable in future endeavors where used nails would be satisfactory. Cat's paws and their like also require substantial space around nail to get the requisite leverage. Accordingly, current handheld nail-removing tools do not work well in tight spaces such as between joists, or other spaces where there is little to no room to get leverage.

As can be seen, there is a need for a nail pulling or removing device for use with a palm nailer dimensioned and adapted to be small and can easily fit with the removal tool in small spaces, whereby the nail pulling or removing device easily removes nails in a linearly upward direction without a lot of force applied by the user.

SUMMARY OF THE INVENTION

In embodiments of the present invention nails are pulled straight out of the material using the pneumatic force of a palm nailer, thereby less manual force must be applied by the user.

The device embodied by the present invention, applies a linear longitudinal force instead of a rotational, bending force which is used with claw and prybar devices, thereby the present invention minimizes the workspace or struggle for purchase on surface surrounding the target nail.

In one aspect of the present invention, a nail removing device configured to operatively associate with an actuated nail driver, the nail removing device includes the following: a shaft extending between a nail end and a driver end; the nail end providing a nail engager; and the driver end providing a driver interface for the actuated nail driver, wherein the interface is configured to prevent lateral movement of the actuated nail driver relative to the driver end.

In another aspect of the present invention, the nail removing device further includes, wherein the nail engager and the driver interface are spaced apart from the shaft in a nail direction and a driver direction, respectively, wherein the nail direction and the driver direction are in a shared direction, wherein the nail direction and the driver direction are approximately a shared distance, wherein the driver interface comprises a cylindrical protrusion extending a downward direction toward the nail engager, wherein the driver interface is disposed on a driver shaft that extends from the shaft by at least two inches, wherein the driver interface is disposed along an underside of the driver shaft; further including a guard configured to removably attach to the shaft, wherein the nail engager is a V-shaped crotch dimensioned to receive a shaft of the nail and engage an underside of a head of the nail, and wherein the actuated nail driver is configured to selectively provides a linear force against the driver interface. It is understood that the term actuated refers to non-manually powered, such as pneumatically powered or the like listed on page 4 herein.

In yet another aspect of the present invention, a method of improving an actuated nail driver, the method provides operatively associating the actuated nail driver with the driver interface of the above-mentioned nail removing device; and engaging an underside of a nail with the nail engage of said nail removing device.

These and other features, aspects and advantages of the present invention will become better understood with reference to the following drawings, description and claims.

DETAILED DESCRIPTION OF THE INVENTION

Figure 1:
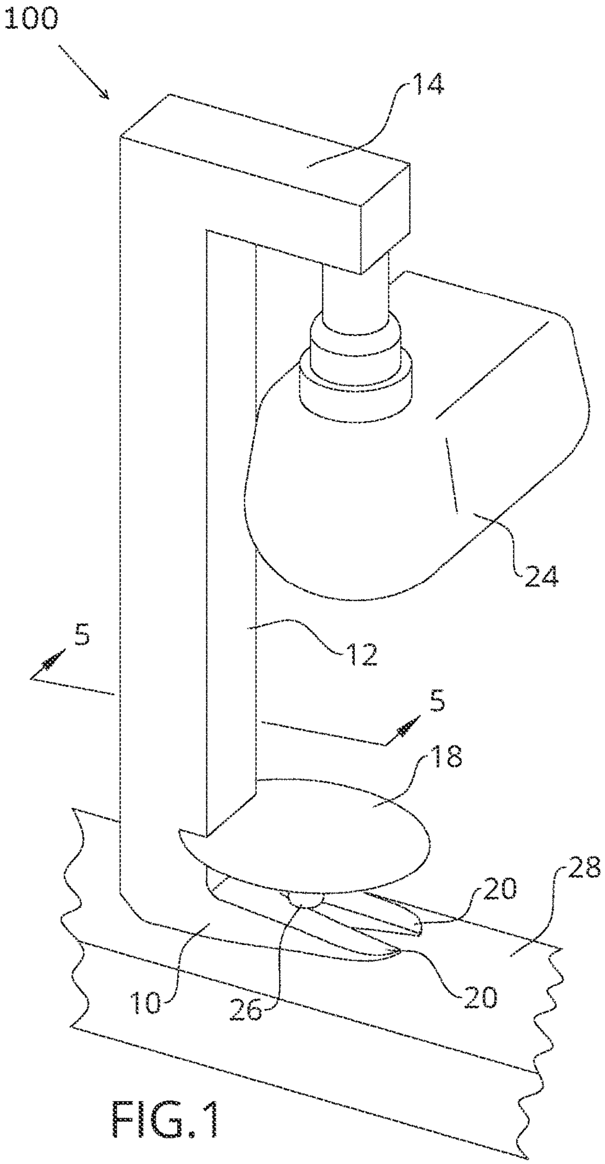
FIG. 1 is a top perspective view of an exemplary embodiment of the present invention, shown in use.
Figure 2:
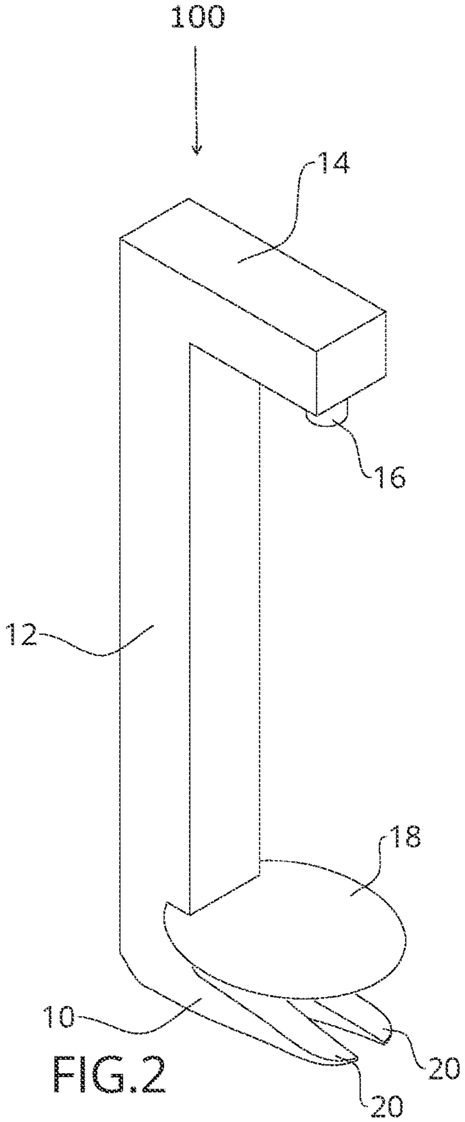
FIG. 2 is a top perspective view of an exemplary embodiment of the present invention.
Figure 3:
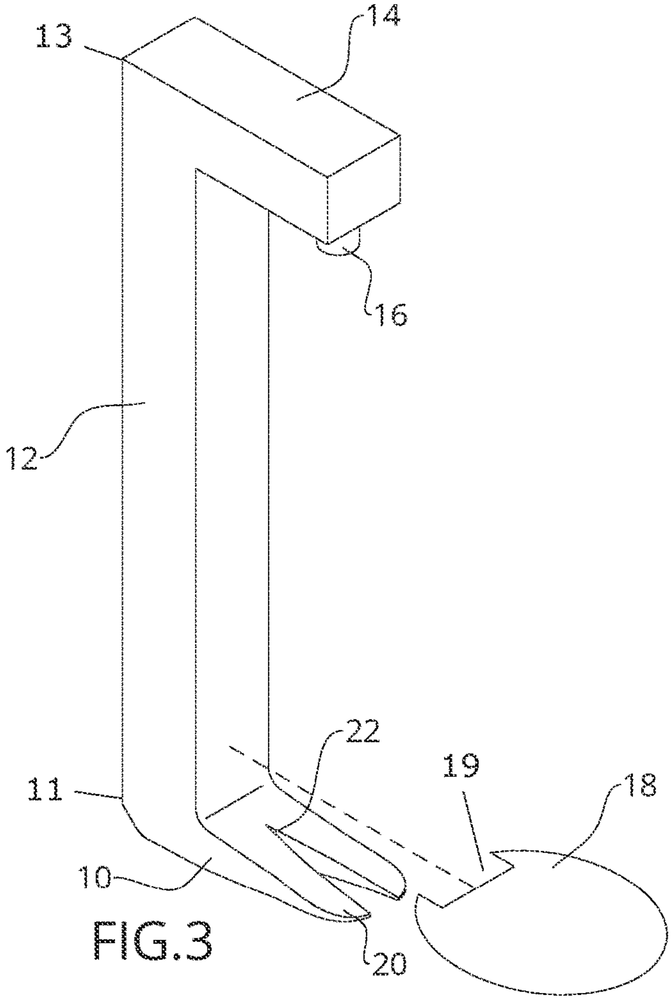
FIG. 3 is an exploded top perspective view of an exemplary embodiment of the present invention.
Figure 4:
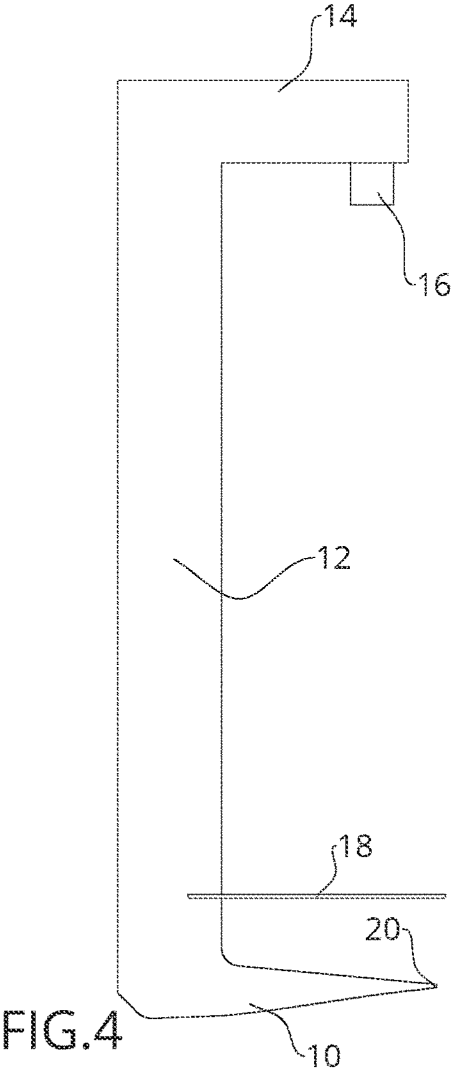
FIG. 4 is a front elevation view of an exemplary embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a nail-removing device operatively associable with a pneumatic nail driver, affording a method of improving the pneumatic nail driver. The nail-removing device has a shaft extending between a nail end and a driver end. The nail end provides an engagement portion for engaging the underside of a nail. The driver end provides a stabilizing interface configured to operatively associate with the pneumatic nail driver so as to prevent lateral movement of the pneumatic nail driver relative to the stabilizing interface. The engagement portion and the stabilizing interface may be spaced apart from the shaft in the same direction.

Referring now to FIGS. 1 through 5 the present invention may include a nail pulling or removing device 100 for use with a palm nailer 24.

The palm nailer 24 may be any form of hammer used to drive nails by compressed air (pneumatic), electromagnetism, highly flammable gases such as butane or propane, or, for powder-actuated tools, a small explosive charge. The palm nailer 24 is configured to produce a linearly directed force as a result of activation of above-mentioned driving modalities.

The device 100 embodied by the present invention includes a shaft 12 extending between a claw end 11 and a nailer end 13. The claw end 13 may have a claw portion 10 extending in a claw direction substantially perpendicular relative to the shaft 12. The claw portion 10 may have a V-shaped cleft or claw crotch 22 for gripping nail heads. Divergent teeth 20 of the claw portion 10 define, at least in part, the V-shaped claw crotch 22. Different shaped claw portions 10 could be used to capture the nail heads as long as the claw crotch 22 is dimensioned and adapted to capture the nail 26.

Just upward of the claw portion 10, along the shaft 12, a guard 18 may be removably attached. The guard 18 may be made of metal or any other sufficient durable material. The guard 18 may be various planar shapes so as to prevent an extracted nail from striking a user. The guard 18 may have a cutout 19 dimensioned and adapted to slidable be secured to the shaft 12.

A nailer shaft 14 may extend from the nailer end 13 in a nailer direction substantially perpendicular relative to the shaft 12. The nailer direction and the claw direction may be identical and/or parallel; though, in other embodiments the nailer and claw directions may be different directions. The nailer shaft 14 may provide a stabilizer interface 16. The stabilizer interface 16 may be a cylindrical protrusion, trunnion, or any interface configured to operatively associate with and to accept and stabilize the palm nailer 24. The stabilizer interface 16 may be shaped multiple ways such as shaping it exactly in the shape of a nail head, the top could be rounded or shaped like a mushroom, or the like. Many shaped protrusion/interface 16 would allow the device 100 to work. The protrusion/interface 16 could be flat, but the user would have to independently maintain stability to keep the palm nailer 24 from sliding off. The protrusion/interface 16 could have a depression that would capture the palm nailer 24 and keep it from sliding off also. A flat surface that is knurled, fenestrated or roughened could also be used but there would still be a tendency for the palm nailer 24 to slide off.

Figure 5:
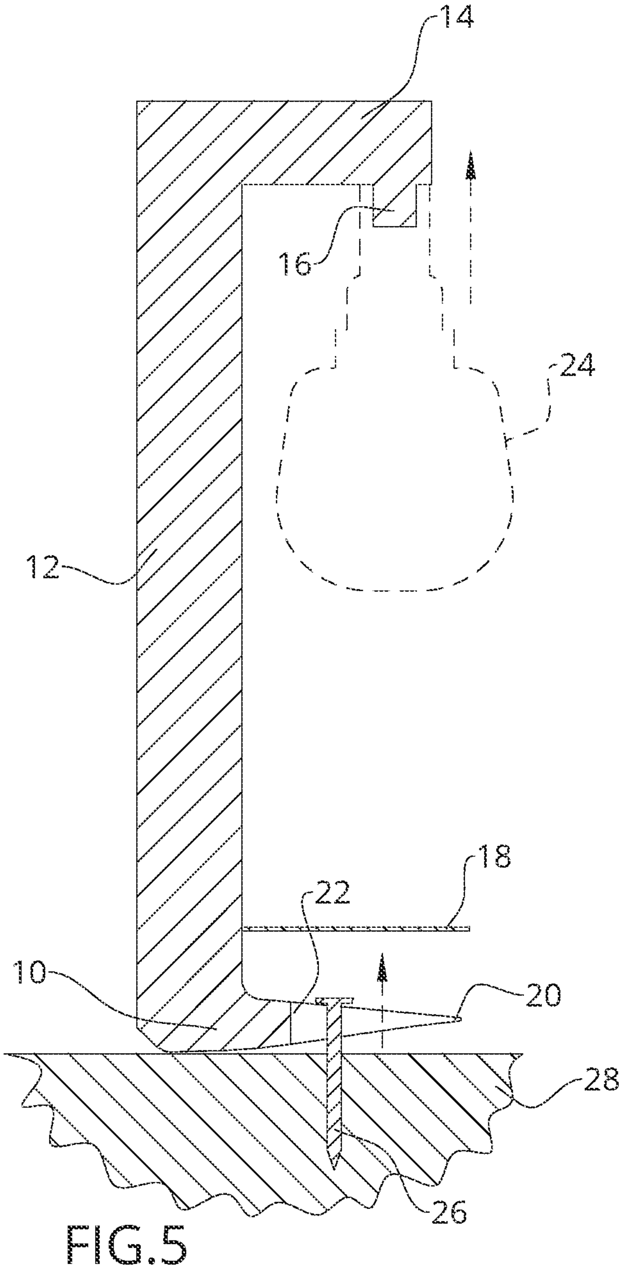
FIG. 5 is a section view of an exemplary embodiment of the present invention, taken along line 5-5 in FIG. 1.

The teeth 20 of the claw portion 10 are placed around the shaft of the nail 26 just below the head such that the head of the nail is capturable by the upper surface of the claw crotch 22. After the nail 26 is captured, a palm nailer 24 is operatively associated with the stabilizer interface 16. The pneumatic palm nailer 24 can then be activated to easily remove the nail 26 from its substrate 28, whereby the pneumatic palm nailer 24 provides a linearly upward force, as illustrated in FIG. 5, thereby urging the entire device 100 and thus the claw portion 10 upward, which dislodges the nail 26 from its substrate 28 in the same linearly upward direction.

The guard 18 prevents the nail from injuring the user; though, some users may prefer to ease up on the palm nailing toward the end of nail extraction to prevent the nail 26 from becoming a flying projectile.

A vise or vise grip or clamp could be placed on the claw end 11 to remove nails with broken heads or to remove nails through the wood by pulling on the pointed end of the nail which would work very well for finishing nails and other small-head or headless nails. The vise or clamp would also prevent the nail from becoming a flying projectile after removal.

The device 100 could be used in the manner previously described. It can be made in multiple different sizes. A very small size may not be as comfortable for the user to use on a routine basis but could be very useful in tight spaces such as nails between joist and studs where there is typically only 14 to 14½ inches of working space for nail removal.

Additionally, the present invention could be used to remove automobile bushings with proper attachments on the claw end 11. The present invention can be used for any applications where a slide hammer would be used with the proper attachments on the claw end 11. The present invention can be used to remove stakes or fence posts nailed in the ground or any other press fit or embedded items with the proper attachments on the claw end 11. In sum, if the claw end 11 is replaced with a vise grip, clamp, or three-jaw chuck it can be used to pull out or extract anything that fits in the attachment.

Note, the present invention could be used without the palm nailer 24 as a standard cat's paw nail remover if needed (e.g., if the palm nailer 24 ran out of power).

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A nail removing device configured to operatively associate with an pneumatic nail driver, the nail removing device comprising a shaft extending between a nail end and a driver end;

the nail end providing a nail engager, wherein the nail engager extends in a first direction oriented substantially orthogonal to a longitudinal axis of the shaft;

the driver end providing a driver shaft that extends in the first direction;

a driver interface for the pneumatic nail driver, wherein the driver interface is disposed on the driver shaft and extends toward the nail engager in a second direction parallel with said longitudinal axis;

the pneumatic nail driver operatively associated with the driver interface to provide a linear force directed in a third direction opposite the second direction; and a guard extending from the shaft in the first direction so as to be disposed between the pneumatic nail driver and the nail engager.

2. The nail removing device of claim 1, wherein the driver interface comprises a cylindrical protrusion.

3. The nail removing device of claim 1, wherein the driver interface is located at least two inches from the shaft.

4. The nail removing device of claim 3, wherein the driver interface is disposed along an underside of the driver shaft.

5. The nail removing device of claim 1, further comprising a notch defined by the guard, wherein the notch is configured to removably attach the guard to the shaft.

6. The nail removing device of claim 1, wherein the nail engager is a V-shaped crotch dimensioned to receive a shaft of the nail and engage an underside of a head of the nail.

7. The nail removing device of claim 1, wherein the pneumatic nail driver is configured to selectively provide the linear force against the driver interface.

* * * * *